Sept. 25, 1934.　　　　　P. GRAY　　　　　1,974,610
GALVANIZING POT CONSTRUCTION
Filed April 16, 1934
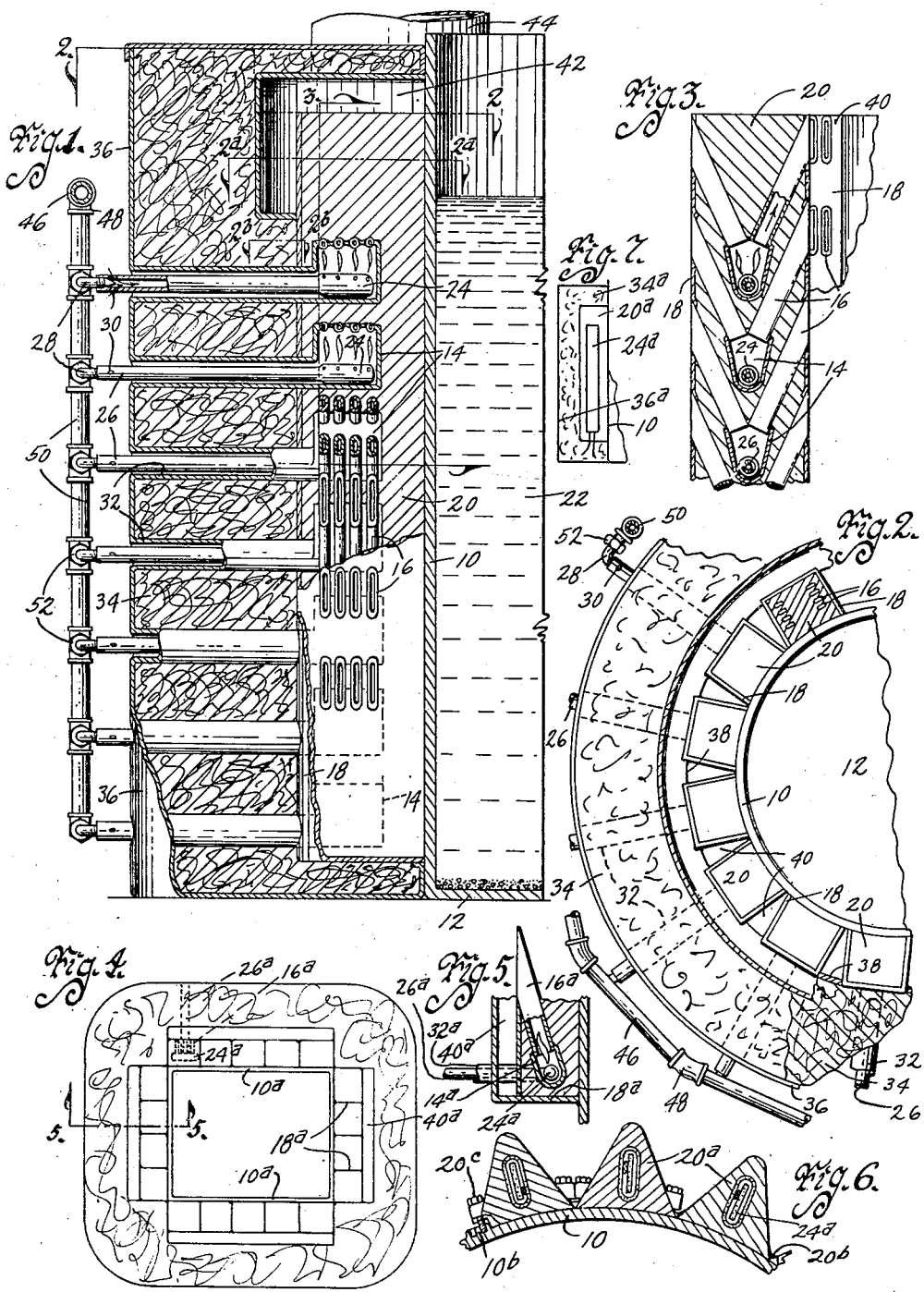
Witness
Edw. Seeley
Inventor:- Percy Gray
by Bair, Freeman & Sinclair
Attorneys Patented Sept. 25, 1934

1,974,610

UNITED STATES PATENT OFFICE 1,974,610

GALVANIZING POT CONSTRUCTION

Percy Gray, Jefferson, Iowa

Application April 16, 1934, Serial No. 720,775

15 Claims. (Cl. 263—14)

The object of my invention is to provide a galvanizing pot construction which is efficient, simple, durable and comparatively inexpensive to manufacture.

A further object is to provide a metal melting pot construction which is heated by a plurality of heaters, the transmission of the heat from the heaters to the pot proper being such that it is slow and equally distributed to thus eliminate "hot spots" on the wall of the pot proper.

In this connection, it may be mentioned that especially where iron or steel tanks are used for melting zinc so that articles can be galvanized in the zinc, the iron of the pot gradually alloys with the zinc, causing a dross to form in the bottom of the pot and thus the pot is gradually disintegrated. The higher the temperature, the faster disintegration occurs.

At about 850 degrees F., disintegration is slow, but if the temperature rises to 890 degrees, the rate of disintegration rapidly increases so that by the time 910 degrees is reached, a very fast disintegration occurs and the speed of disintegration is quickly accelerated as the temperature goes on up from 910 degrees.

Articles are best galvanized at temperatures ranging from 835 degrees to 865 degrees, depending on their thickness, etc., and as long as the entire surface of the melting pot can be maintained within these limits, disintegration thereof is within practicability.

It is quite difficult, however, to arrange heaters with relation to the pot so that its surface is heated evenly. Heretofore various schemes have been devised, such as providing a great number of heating elements so that they can be equally spaced over the surface of the pot, or designing heat flow passageways so that all parts of the pot are contacted by the heat generated with approximate equality.

Even with the best installations at present, there is too much likelihood of hot spots developing caused by faulty design or by crowding production and forcing the pot to a high temperature and when a spot becomes hotter than 890 degrees, speeding up of the disintegration at that point, of course, occurs. Ordinarily, if one spot tends to get hot at one time, it tends to get hot anytime the pot is in operation and consequently this spot will soon be entirely disintegrated and the pot proper must then be discarded.

Because of these difficulties, it is not uncommon for the life of a pot to be as short as a week or two, notwithstanding the fact that the wall of the pot is made an inch and a half or two inches in thickness. Some cases have been reported of pots lasting as long as seven years, but five or six months under constant production is about the average. It is thus obvious that pot life is very uncertain and it has been found that it is mostly due to uneven heating conditions.

It is therefore the primary object of my invention to overcome the difficulties enumerated by providing a metal path for the heat from the heaters to the pot in the form of castings or fillings of quick heat conducting metal such as aluminum.

Still a further object is to so design the castings or fillings and associate them with the pot that they are in intimate contact with its wall, whereby the heat conducted by them from the heaters is quickly absorbed by the pot wall and then by the zinc or other metal therein.

Still another object is to design a metal melting pot construction having superior operating efficiency by practically enclosing the entire heat source in a high heat conducting metal body, the body being in intimate contact with the pot, the highest temperature to insulate against being but little higher than the pot itself, probably never higher than 1000° F. and thus eliminating the requirement for fire brick or other high temperature protection for the hot side of a flame or electric heating unit where the temperature would range from 1500 to 2000° and in which more heat would be driven through the insulating wall to the room, which would greatly increase fuel or electric energy consumption.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a vertical, partial sectional view through a galvanizing pot construction embodying my invention.

Figure 2 is a sectional view on the line 2—2 of Figure 1 with the upper sectioned part of the figure taken on the line 2a—2a of Figure 1 and the lower sectioned part of the figure taken on the line 2b—2b of Figure 1.

Figure 3 is a sectional view taken on the line 3—3 of Figure 1.

Figure 4 is a diagrammatic plan view showing a modified arrangement.

Figure 5 is a sectional view on the line 5—5 of Figure 4.

Figure 6 is a horizontal sectional view of a modified construction, showing electric heating elements instead of gas heaters as in Figure 1; and Figure 7 is a vertical diagrammatic view of the construction illustrated in Figure 6.

On the accompanying drawing, I have used the reference numeral 10 to indicate the pot proper. It has a bottom 12 and is open at its top. It is usually formed of iron or steel of considerable thickness and by my construction, I have found that its thickness can be reduced about twenty-five to thirty-five percent without reducing the average life of the pot as compared with present day usage.

Surrounding the pot 10 is a plurality of heater casings 14, each having two series of flues 16 directed upwardly and diverging as in Figure 3. A plurality of the heater casings 14 is spaced vertically as shown in Figures 1 and 3 and each such plurality is incased with a filling casing 18. The casing 18 extends vertically along the wall of the pot 10, as shown in Figure 2, and within it I provide a filling 20. The filling 20, in the case of a galvanizing pot, is preferably aluminum or the like. I select aluminum because it has quick heat conducting characteristics yet is inexpensive.

Copper would be better as a heat conductor, but it is entirely too expensive for practical purposes. The essential characteristic of the filling 20 is that it shall have a higher melting point than melted metal 22 in the pot 10, although operation of the invention with the filling 20 in melted condition is not objectionable providing it does not have a tendency to alloy with the heater casings 14, thus causing their disintegration.

Each heater casing 14 contains a heater 24, which as shown in Figure 1 is a gas burner. The heater is merely an enlarged perforated head on a pipe 26 to which gas and air are supplied. The gas is supplied through a nozzle 28, while primary air is supplied through openings 30 by venturi action. Secondary air is supplied to each burner 24 by a tube 32 extending to the heater casing 14.

The tubes 32 extend through a layer of insulation 34 which is confined between the filling casings 18 and an outer casing 36. Walls 38 extend between the outer corners of the casings 18 whereby flue spaces 40 are formed into which the gases of combustion from the flues 16 can discharge. The spaces 40 communicate at their upper ends with a manifold 42, which in turn communicates with one or more outlet pipes 44 leading to a smoke stack, if desired.

For supplying gas to each nozzle 28, I provide a supply pipe 46 having T fittings 48 communicating with vertical headers 50. A coupling member 52 connects each nozzle 28 with the headers 50.

In constructing the galvanizing pot in accordance with my invention, the casings 14 and 18 and the tubes 32 may all be welded with respect to each other and the casings 18 then welded to the pot 10. Thereafter aluminum is melted and poured into the casings 18 and will subsequently harden. During the hardening or cooling process, the aluminum may shrink slightly, but when it is again heated to pot operating temperature, it will re-expand and in slightly greater proportion than the elements which confine it so that intimate contact is insured.

Intimate contact is quite desirable to effect quick and ready transmission of heat from the fillings or masses of metal 20 to the pot 10. The fillings will also quickly absorb the heat from the heater casings 14 and instead of this heat seeking the shortest path to the pot 10, it will be diffused throughout the mass 20 and flow slowly and with absolute uniformity to the pot from the entire surface of the mass 20 contacting therewith.

My construction is not necessarily confined to the particular arrangement shown in the first three figures of the drawing. For instance, as shown in Figure 4, a rectangular rather than a cylindrical pot 10a can be heated with filling casings 18a arranged along each wall. The flues 16a can then be directed outwardly to flue spaces 40a instead of providing flue spaces between the casings 18a. This arrangement and many others are possible without departing from the essential feature of quick heat conducting metal masses interposed between the heaters and the pot.

As shown in Figures 6 and 7, electric heating elements 24a can be substituted for the burners 24. These are preferably of flat shape, such as illustrated in my Patent No. 1,890,780, which issued on December 13, 1932. The heating elements 24a are preferably mounted edgewise with respect to the pot 10. The masses 20a, instead of being incased, may be aluminum castings secured as by welding 20b, or by cap screws or the like 20c entering bosses 10b of the pot 10.

The heating elements 24a are preferably entirely imbedded in the castings 20a, as shown in Figure 7, and then insulated by a layer of insulation 34a much in the same manner as illustrated in Figure 1.

There is a definite reason for mounting the heating elements 24a edgewise. This is because most of the heat is radiated from the flat surfaces of the heating element and the heat can thus enter the triangular-shaped castings 20a equally from both sides of the heating element and then flow in an evenly distributed fashion to the pot 10, as any point in the casting 20a tending to become hotter than another point is automatically taken care of because heat in a quick heat conducting metal mass quickly flows from a high temperature point to a low temperature point and becomes balanced throughout the mass.

If the heating elements 24a were mounted flatwise, then there would be as much heat radiated away from the pot 10 as toward it and this would have to be deflected and turned back toward the pot, which is a difficult thing to do.

Some changes may be made in the construction and arrangement of the parts of my device without departing from the real spirit and purpose of my invention and it is my intention to cover by my claims, any modified forms of structure or use of mechanical equivalents, which may be reasonably included within their scope.

I claim as my invention:

1. In a galvanizing pot construction, a pot proper, a plurality of heaters spaced from the wall thereof and a mass of metal surrounding each heater and intimately contacting with the wall of said pot proper.

2. In a galvanizing pot construction, a pot proper, a plurality of heaters spaced from the wall thereof and a mass of high heat conducting metal surrounding each heater and intimately contacting with the wall of said pot proper.

3. In a zinc melting pot construction, a pot proper, a plurality of heaters spaced from the wall thereof and a mass of aluminum surrounding each heater and intimately contacting with the wall of said pot proper.

4. In a metal melting pot construction, a pot proper, a plurality of heaters spaced from the wall thereof and a mass of metal having a substantially higher melting point than the metal to be melted in said pot proper, said mass of metal surrounding each heater and intimately contacting with the wall of said pot proper.

5. A metal melting pot construction comprising a pot proper, a plurality of heaters spaced from the wall thereof and a mass of metal for each heater, said heaters being spaced along said wall and said masses being each arranged to surround a heater and to intimately contact with said wall, said masses being arranged side by side.

6. A metal melting pot construction comprising a pot proper, a plurality of heaters spaced from the wall thereof, a mass of metal for each heater, said heaters being spaced along said wall and said masses being each arranged to surround a heater and to intimately contact with said wall, said masses being arranged side by side, said heaters being adapted for burning combustible substances, spaces between said masses and a flue from each heater through the masses to said spaces.

7. A metal melting pot construction comprising a pot proper, a plurality of heaters spaced from the wall thereof, a mass of metal for each heater, said heaters being spaced along said wall and said masses being each arranged to surround a heater and to intimately contact with said wall, said masses being arranged side by side, said heaters being adapted for burning combustible substances, spaces between said masses, a flue from each heater through the masses to said spaces, a manifold communicating with said spaces and an outlet from said manifold.

8. In a metal melting pot construction, a pot proper, a plurality of heaters spaced from the wall thereof, a mass of metal having a substantially higher melting point than the metal to be melted in said pot proper, said mass of metal surrounding each heater and intimately contacting with the wall of said pot proper and a layer of insulating material surrounding said pot proper, heaters and mass.

9. In a metal melting pot construction, a pot proper, a plurality of heaters spaced from the wall thereof, a mass of metal having a substantially higher melting point than the metal to be melted in said pot proper, said mass of metal surrounding each heater and intimately contacting with the wall of said pot proper, said heaters being adapted for burning fuel, a layer of insulation surrounding said heaters, said mass and said pot proper and means extending through said layer of insulation from the exterior of said pot construction to supply fuel to said heaters.

10. In a metal melting pot construction, a pot proper, a plurality of heaters spaced therefrom, a heater casing for each heater, a filling casing surrounding each heater casing and extending to the wall of said pot proper and a filling in each filling casing of quick heat conducting metal, said metal being in intimate contact with said heater casings and with said pot proper.

11. In a metal melting pot construction, a pot proper, a plurality of heaters spaced therefrom, a heater casing for each heater, a filling casing surrounding each heater casing and extending to the wall of said pot proper, a filling in each filling casing of quick heat conducting metal, said metal being in intimate contact with said heater casings and with said pot proper, said heaters being fuel fired and flues extending through said fillings to conduct the gases of combustion from said heaters.

12. In a metal melting pot construction, a pot proper, a plurality of electric heating elements spaced from the wall thereof and a mass of quick heat conducting metal surrounding each heating element and extending to said wall and being in intimate contact therewith.

13. In a metal melting pot construction, a pot proper, a plurality of electric heating elements spaced from the wall thereof and a mass of quick heat conducting metal surrounding each heating element and extending to said wall and being in intimate contact therewith, said electric heating elements being of flat construction and mounted edgewise relative to said wall.

14. In a metal melting pot construction, a pot proper, a plurality of electric heating elements spaced from the wall thereof and a mass of quick heat conducting metal surrounding each heating element and extending to said wall and being in intimate contact therewith, said electric heating elements being of flat construction and mounted edgewise relative to said wall, each heating element being entirely imbedded in its mass of metal.

15. In a metal melting pot construction, a pot proper, a plurality of electric heating elements spaced from the wall thereof and a mass of quick heat conducting metal surrounding each heating element and extending to said wall and being in intimate contact therewith, said electric heating elements being of flat construction and mounted edgewise relative to said wall, each mass of metal being substantially triangular shaped with its base against said pot proper.

PERCY GRAY.